Feb. 11, 1969　　　F. J. G. CLOUP　　　3,427,518
DIGITALLY CONTROLLED POSITIONING DEVICE
Filed Aug. 24, 1964

INVENTOR.
FRANCIS JEAN GABRIEL CLOUP.
BY
ATTORNEY.

INVENTOR
Francis Jean Gabriel Cloup

ATTORNEY

United States Patent Office 3,427,518
Patented Feb. 11, 1969

3,427,518
DIGITALLY CONTROLLED POSITIONING DEVICE
Francis J. G. Cloup, Paris, France, assignor to Societe dite Promat, Latresne, France, a company of France
Filed Aug. 24, 1964, Ser. No. 391,457
Claims priority, application France, Aug. 31, 1963, 946,251
U.S. Cl. 318—18
Int. Cl. H02p 7/00
2 Claims

ABSTRACT OF THE DISCLOSURE

A control system for use in the processing of an elongated workpiece by means of a number of treatment operations in which the processing tools or equipment are located in a number of working planes transverse to an axis of relative movement between the tools and the workpiece, and the relative movement and actuation of the individual tools is coordinated by prior programming of the control system.

BACKGROUND OF THE INVENTION

Field of the invention

The invention relates particularly to control systems for processing a workpiece where an elongated workpiece (for example an angle member) is intended to make up a post or metal beam and in one face of this angle member it is necessary to make holes by punching or drilling, at well determined locations, while in the other face it is necessary to make holes of different sizes, at other locations. These holes are intended for mounting the post or beam by riveting or bolting.

DESCRIPTION OF THE PRIOR ART

To perform these operations, particularly punchings on an elongated workpiece, the workpiece has been placed on a bench parallel to a runway along which a carriage, carrying a punch, moves; the position of the carriage is marked on a linear scale. The carriage is brought either by hand or mechanically aligned with the place where the punching is to be performed, and the punch is put into action. Then the carriage carrying the punch is again moved to another location, and so on for all the holes of the same size that can be made with the same punch in the same position on the carriage.

Further, it is generally necessary to make holes of different size or differently placed (for example, on another face of the workpiece, if an angle member is involved) and in this event the first punch of the carriage is removed to be replaced by another, or the carriage is removed and replaced by another, either on the same runway or on another, and the operation is begun again, either with the same punch differently placed in relation to the workpiece, or with another tool, for example a drill. Finally the operation is ended by cross-cutting of the workpiece.

SUMMARY OF THE INVENTION

According to the invention, there is provided a numerical control positioner comprising a carriage adapted to support a workpiece and move it either rapidly or slowly relative to a process group comprising machines or process devices in a plurality of working planes spaced along the direction of said relative movement for processing the workpiece, a read-out device to detect in quantised form the carriage position relative to a given datum of said group, respective pulse counters for each working plane being arranged to be fed from the read-out device, a controller associated with each machine and each controller, in dependence upon the output from any counter coupled to it, being arranged to switch said relative movement to a slow running speed on the approach to a predetermined operating position of its machine, to lock the carriage and machine group relative to each other at said position and to actuate the operation of said machine. Conveniently, the process group is stationary and the workpiece is traversed on its carriage past the group.

The predetermined operation positions of the machine may be posted on one or more display panels and comparators associated therewith can be provided to compare the setting indicated by the read-out device with the required operating positions. Each panel may also comprise markers indicating the machines to be employed at particular operating positions.

In one arrangement according to the invention, a motor, e.g. hydraulically driven, is provided for traversing the carriage, a control device connected to the motor giving a choice of high or low running speeds and means are provided to lock the carriage position after the motor has been set to a slow running condition. The controllers for the respective machines may each comprise an entry trigger or bistable circuit operating an and-gate which causes said slow running and feeds a cyclic counter connected to an output trigger or bistable circuit to cause said locking to come into effect after a certain delay and also to start operation of the associated machine. The machine would have an end-of-work indicator feeding the controller. The set of controllers of the arrangement have a first or-gate grouping the outputs of the entry triggers and a second or-gate grouping the outputs of the output triggers.

In operation, when one or more comparators detects or detect a coincidence, a signal is transmitted to the or each controller designated by the or each display panel concerned by the coincidence and changes over the entry trigger of such controller or controllers, with the results that through the first or-gate of the set of controllers, there is action upon the motor control device to reduce the motor speed, while the and-gate of each activated controller is opened. Like the others, this particular and-gate receives the counting pulses which reach the cyclic counter with effect from the time when the and-gate opens; the counter, when it has completed one revolution, produces a signal which changes over the output trigger so that through the second or-gate of the set of controllers, the carriage-locking mechanism is actuated to stop the workpiece, and the start device of the machine associated with the activated controller is operated. A number of machines can be started and can operate simultaneously. While they operate the workpiece is stationary and the cyclic counters, since they receive no further counting pulse, do not advance.

When a machine has completed an operation, its end-of-work indicator resets the two triggers of its controller. When all the actuated machines have finished their work, all the corresponding input and output triggers are reset, and if no other signal is gated through the first or second or-gate of the set of controllers the carriage-locking device releases and the motor control device changes the motor over to fast running. The workpiece starts to move again until the next coincidence occurs, and the cycle restarts until all the operations posted on the display panels have been completed. The carriage then returns to its starting position and the counters associated with the display panels are reset.

It is convenient to arrange that a display panel is provided for each working station as, in this manner, the distances between the planes can be compensated for by causing the counting signals to the comparators to be taken from false zeroes which will have a single value for each respective panel. Thus, the stagger between working planes is provided for in the different resetting of the counter associated with each display device.

In one particular embodiment of the invention, each display panel takes the form of an insulating rectangular sheet bearing a first set of conductive strips parallel with one side of the sheet equal in number to the number of machines, a second set of conductive strips parallel with the same side of the sheet and equal in number to the numerical outputs of the counter associated with the panel and a set of parallel conductive bars which are perpendicular to the strips and which cross but do not electrically contact them, the bars being equal in number to the number of operations which can be performed in the working plane assigned to the panel. On each bar is a slider or marker to denote the machine which is required to operate and further markers to display the different numerical orders of the reference of the operation to be performed. Electrical means providing the required logical connections can comprise, for each bar, means for its maintenance at a desired potential through a resistor and, for each marker, a serially connected diode.

When each display panel corresponds to one particular working plane, and the number of bars in operation on such panel corresponds to the number of operations to be performed in the working plane of that particular panel, the real station reference of the operation is displayed, and the stagger between working planes is introduced into the counter associated with the panel by means of the differential resetting system previously referred to. However, if there is a shortage of bars for one working plane and if all the working planes are not in use, a number of panels can be allotted to a single working plane. To this end, the counters associated with the panels can comprise a control for giving any counter the value corresponding to any working plane. If there is a shortage of bars on one panel for a given working plane and all the working planes are in use, the excess operations of that panel can be transferred to a different panel, in which event the real reference amended by the reference difference between the two working planes corresponding to the two panels concerned must be displayed.

One example of the invention and its manner of operation will now be more particularly described with reference to the accompanying drawings wherein:

DESCRIPTION OF PREFERRED EMBODIMENTS

Figures 1, 4, 5:
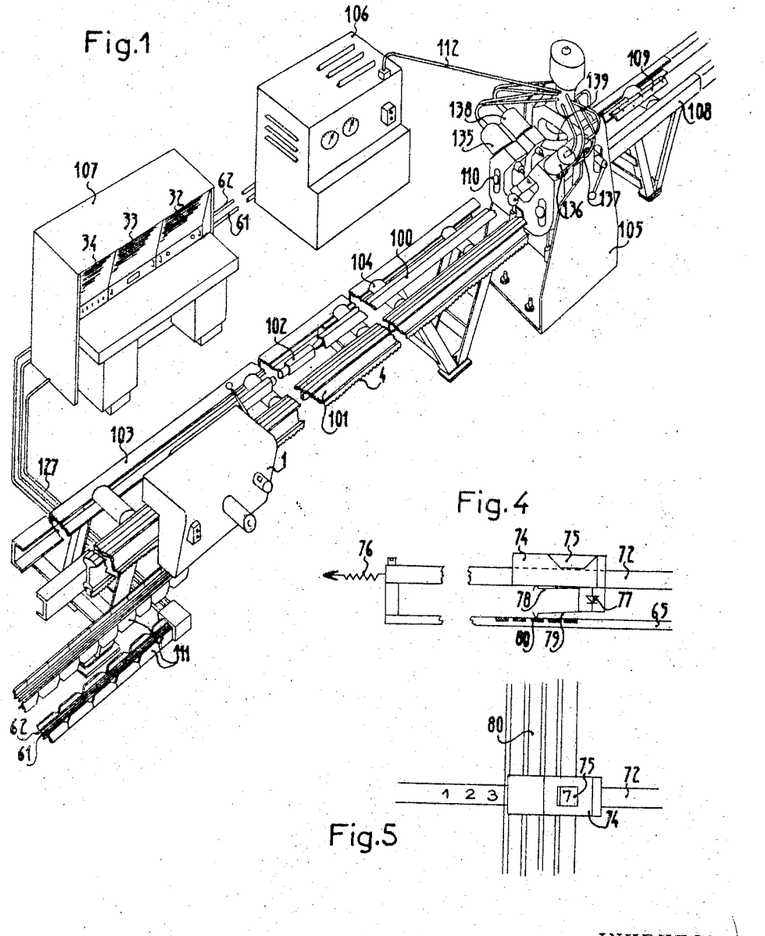
FIG. 1 is an overall view of a system according to the invention.
FIGS. 4 and 5 show details of the display panels illustrated in FIG. 3.

Referring more particularly to FIG. 1 of the drawings, a carriage 1 driven by a built-in motor 5 (FIG. 2) can move along a longitudinal bearing member 101 having a toothed rack 4 for moving the carriage. A clamp 102 fixed to the carriage 1 secures a workpiece 100, such as an angle-member, which is borne by rollers, as 104, associated with a bed or bench 103. Two hydraulic lines 61, 62 extend to the carriage 1 from a hydraulic station 106, and an electric cable connection 127 extends to the carriage 1 from a control station 107. The three lines 61, 62, 127 are supported adjacent the carriage by a cable-bearing chain 111 in manner known per se or by any other means enabling the carriage to move freely.

A frame 105 bears a process group or machine tool unit 110 disposed on the path of the workpiece 100. The group 110 comprises machines or devices for performing various operations on the workpiece, such as punches 135–138 and a cutting ram 139, a pressure fluid line 112 connecting the process group 110 to the hydraulic station 106 and the various machines are supported in guides (not shown) as the frame 105. The punches 135, 136 are disposed in a first working plane perpendicular to the workpiece, the punches 137, 138 are disposed in a second working plane and the ram 139 is disposed in a third working plane. By way of explanation, there can be seen a workpiece 109 which has passed through the group 110 to be punched and cross-cut therein and which is now disposed on a delivery bench 108. The control station 107 comprises three display panels 32–34 which will be described in more detail with reference to FIG. 3.

Figure 2:
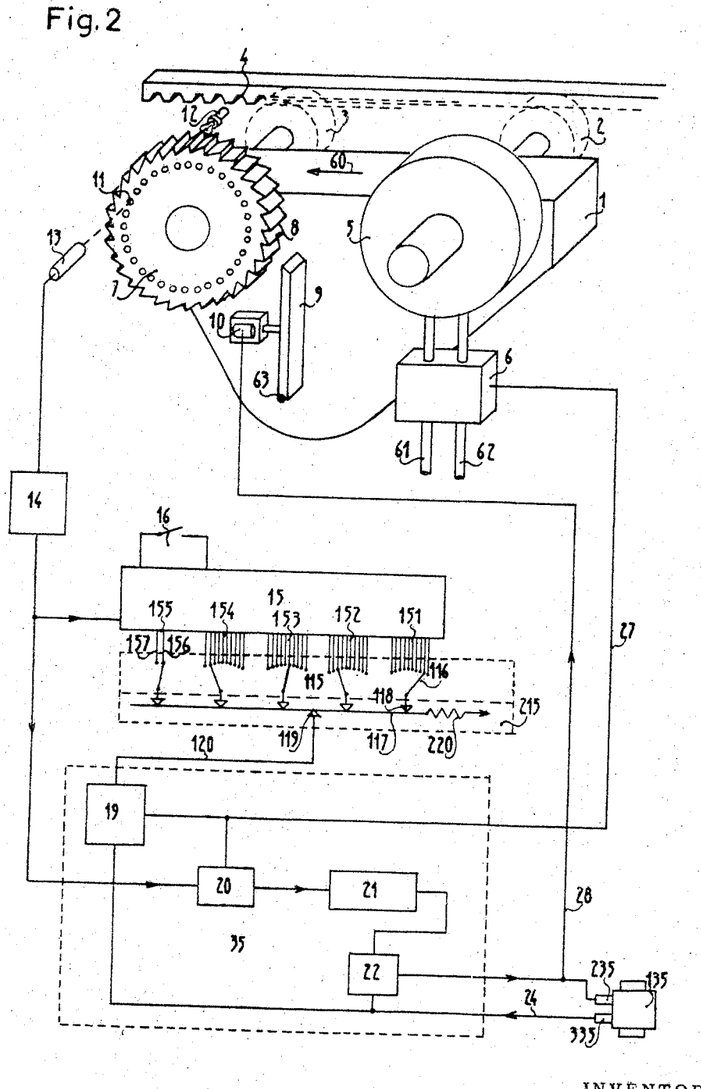
FIG. 2 diagrammatically illustrates the system controlling workpiece advance for a single machining operation.

Referring now to FIG. 2, the carriage 1 is shown in greater detail. It comprises the motor 5 which, through a pinion 2 and the toothed rack 4, can drive the carriage 1 in the direction indicated by arrow 60. The motor 5 is, for instance, hydraulic and is controlled via a control device 6, which will be described in detail hereinafter and to which the hydraulic supply line 61 and hydraulic return line 62 extend from the hydraulic station 106 in FIG. 1. For detection of carriage position, a pinion 3 meshing with the toothed rack 4 drives a gear 7 formed with passages, as 11, evenly spaced concentrially with the periphery of the gear 7, and a light source 12 and a photodiode 13 are so disposed one on each side of the gear 7 that light can pass through consecutive passages 11 from the light source 12 to the photodiode 13 as the gear 7 rotates. This arrangement in known per se. Disposed in the plane of the gear 7 is a pawl 9 pivotable upon a spindle 63 which extends parallel with the axis of the gear 7. The position of the pawl 9 is controlled by an armature 10 which when in a normal inoperative position keeps the pawl 9 away from the teeth of the gear 7. The armature 10, when it changes over to an operative position, engages the pawl 9 with the gear 7 and a tooth, as 8, thereof is caught by the pawl 9 to lock the carriage 1.

When the gear 7 rotates, the photodiode 13 transmits signals which are processed in a coding device 14 to be emitted therefrom as counting signals or pulses. They are counted in a decade counter 15 which, in the particular example described here, has five decades 151–155. Decades 151–154 have ten outputs and decade 155 has only two outputs 156, 157. The counter can therefore indicate totals from zero to 19999; however, this particular is purely illustrative. A counter resetting device 16 is provided.

Associated with the counter 15 is a display panel 115 which serves to bring the punch 135 into operation after carriage 1 has stopped in a predetermined position set upon indicated by the display panel 115. The panel comprises selector switches, as 116, one of which is provided for each decade. Associated with the panel 115 is a comparator 215 in the form of a bus-bar 117; diodes, as 118, can connect the selectors 116 to the bus-bar 117 which is in turn connected to an output diode 119. The bus-bar 117 is held at a negative potential for instance, through a resistor 220.

It will be assumed that the result of the counter 15 appears as a negative potential at one of the outputs of each decade, the other outputs being, for instance, at zero potential. When—and only when—the counter indicates the reference displayed by all the selectors, as 116, the bus-bar 117 is given a sufficient negative potential to deliver a signal through conductor 120 to a trigger stage or bistable circuit 19 forming part of a controller 35 which controls the punch 135 by an on/off device 235.

The controller 35 also comprises an an-gate 320, a cyclic counter 21 and an output trigger 22. The term "cyclic counter" denotes a counter which is returned to zero by the counting pulse following the counter saturation pulse. When the conductor 120 becomes negative, the trigger 19 changes over, with two results through a conductor 27, the control mechanism 6 of the motor 5 is operated to make the motor run slowly, and the and-gate 20 opens to gate the counting pulses from the coding device 14 to the counter 21 which starts to count. When the conter has completed one revolution it changes over the trigger 22, with two further effects—through a conductor 28 the armature 10 is brought into the operative position, the pawl 9 engages with the gear 7 and the carriage 1 stops. The chosen carriage speed is so slow, and the mechanical inertias are such, that the locking of the carriage takes immediate effect. The second result of the trigger 22 changing over is that the device 235 is actuated to make the punch 135 perform the required operation. Upon completion of the punch operation and end-of-work indicator 335 acts via a conductor 24 to restore the triggers 19, 22, and the initial conditions are restored.

Figure 6:
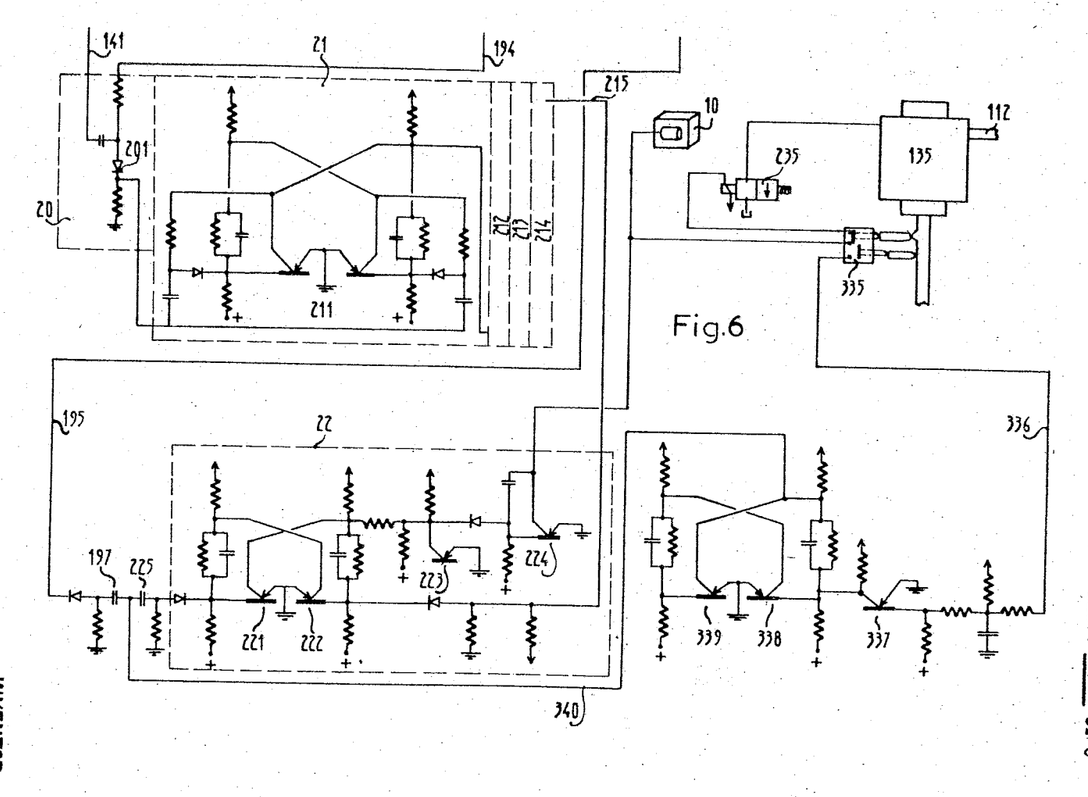
FIGS. 6 and 7, which are complementary to one another, exhibit details of circuits of rectangles of FIG. 2, and FIGS. 8 and 9 are details of operations of the motor control device of FIGS. 2 and 6.
Figure 7:
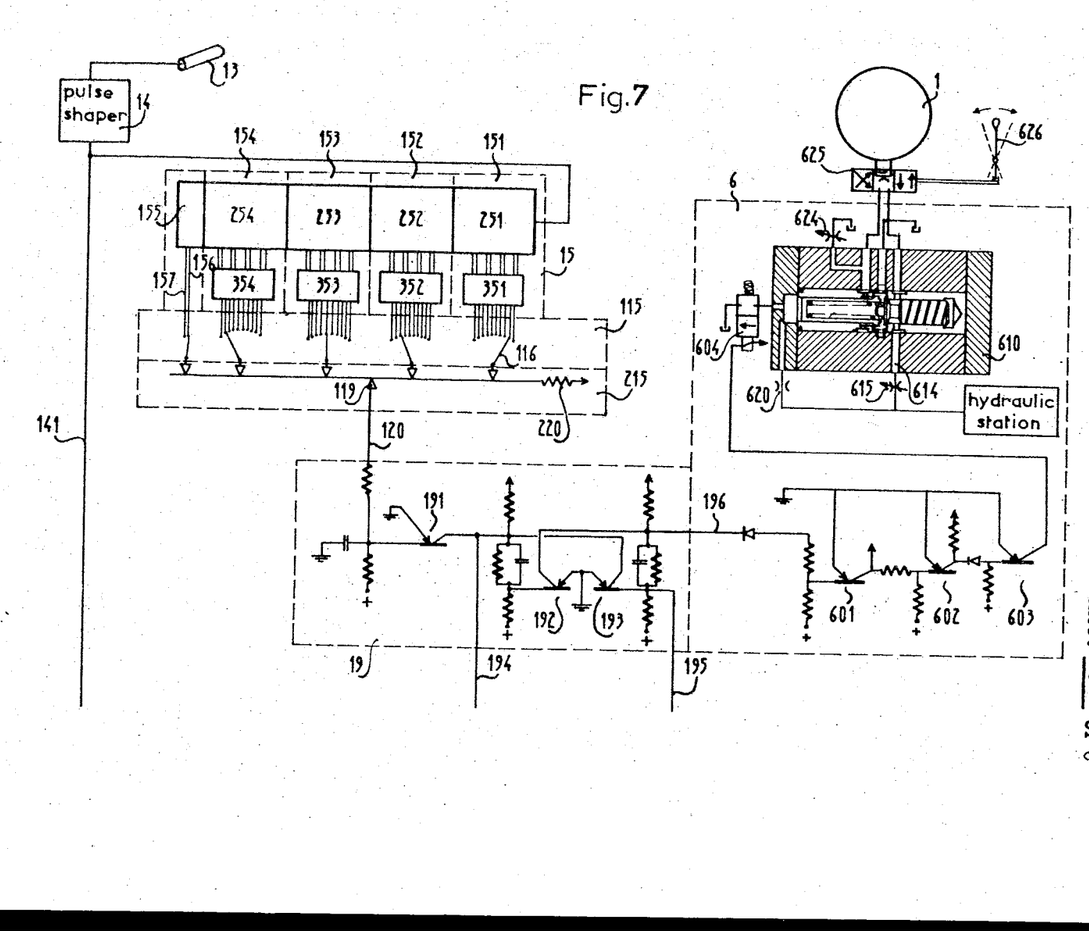

An example of controller 35, with details of circuits 19, 20, 21, 22 and details on control device 6, devices 235 and 335, is shown on the ensemble of the two FIGURES 6 and 7 which are to be laid one on the other, with FIG. 7 on top.

For a better understanding, there has also been shown on these figures photodiode 13 and coding device 14, supposed to be simply a triggered pulse generator. According to a known technique, this coding device could be attacked by two photodiodes close to one another and produce pulses only when toothed wheel 7 turns in the direct direction.

The pulses produced by coding device 14 attack a decimal counter 15 which comprises four binary decimal counters 251–254 and a binary counter 155.

The first binary decimal counter 251 is that of units. It is made up of four binary stages in cascade with the necessary interconnections for it to make a complete turn at the tenth pulse. With this decimal counter is associated a binary decimal decoder 351 which has eight inputs (two for each of the stages of binary decimal counter 251) and ten outputs; to each of these outputs correspounds a digit from zero to nine. The digit of the counting of binary decimal counter 251 appears in the form of a negative potential on one of the ten outputs of decoder 351.

Binary decimal counters 252, 253, 254 are respectively those of tens, hundreds and thousands. With these counters are associated decoders 352, 353 and 354, each having ten outputs.

Binary counter 155 has only two outlets 156 and 157.

The ensemble of counters does not present any novelty in relation to the prior art, and if stage 155 is binary, it is for the following reason: it is advantageous that a counting pulse correspond to one millimeter of advance of carriage 1. Under these conditions, binary decimal counters 251 to 254 and their associated decoding devices 351 to 354 respectively count millimeters, centimeters, decimeters, meters; therefore, binary counter 155 makes it possible to go up to twenty meters, which is broadly enough for current needs.

As explained above, when counting in counter 15 corresponds to the presentation of selectors such as 116, a negative signal appears on lead 120.

This negative signal is sent on input bistable circuit 19 which comprises three transistors 191, 192 and 193; transistor 191 constitutes a buffer, and transistors 192 and 193 form a bistable circuit with two outputs 194 and 196. Normally, transistors 191 and 193 are blocked or non-conductive; output 194 is at a negative potential, 196 at a potential very close to ground. The opposite happens when input bistable circuit 19 has received a negative pulse through lead 120.

Lead 194 goes to and-gate 20 (FIG. 6), essentially made up of a diode 201. This gate, which is normally closed (negative lead 194), receives by lead 141 the same pulses as those that reach binary decimal counter 251 coming from coding device 14.

Normally, therefore, the counting pulses do not pass through and-gate 20.

But when lead 194 passes to ground potential, andgate 20 transmits counting pulses to counter 21 which is made up of four binary stages 211 to 214, all similar, and this counter starts to count.

At the same time, lead 196 passes to a negative potential which puts into operation control device 6 of motor 1. This control device essentially comprises three transistors in cascade 601, 602, 603 of which the latter 603 is a power transistor whose collector circuit comprises normally closed valve (N.C.V.) solenoid 604. When lead 196 is negative, valve 604 opens.

Valve 604 controls a servo-bloc 610 inserted between the hydraulic station and motor 1. This servo-bloc will be described below; it will be assumed for the moment that when valve 604 is on, motor 1 turns at a slow speed.

In resume, when a negative potential appears on lead 120, motor 1 runs at a slow speed and counter 21 starts to count.

When counter 21 has made a complete turn (therefore, it has counted $2^4=16$ pulses if it has four stages), it produces a negative potential on its output 215 which acts on output trigger or bistable circuit 22, which is essentially made up of two transistors 221 and 222 and an amplification chain comprising two transistors 223 and 224, this latter being a power transistor; in the collector circuit of transistor 224 are in series a bistable double-throw microcontact 335 and an N.C.V. solenoid 235 which constitutes the control element of machine 135.

In the collector circuit of this same transistor is also electromagnet solenoid 10 which controls blocking of motor 1.

Therefore, when counter 21 has made a revolution, motor 1 is blocked and machine 135 starts to operate; when it finishes, its triggers microcontact 335; because of this, valve 235 is no longer on and machine 135 is restored; at the same time, at the moment when bistable microcontact 335 triggers, i.e., at the beginning of restoring of machine 135, a lead 336 is brought to ground potential which, in an amplification chain comprising transistors 337, 338 and 339, produces a negative potential on lead 340, which charges condensers 225 and 197.

When machine 135 has come back to the initial position, microcontact 335 is restored. Lead 336 passes to a negative potential, lead 340 to a positive potential which is transmitted by condenser 225 to bistable circuit 22 which is restored and by condenser 197 and lead 195 to bistable circuit 19, which is also restored.

Motor 1 is unblocked and the cycle restarts at a rapid speed of the motor.

Figure 8:
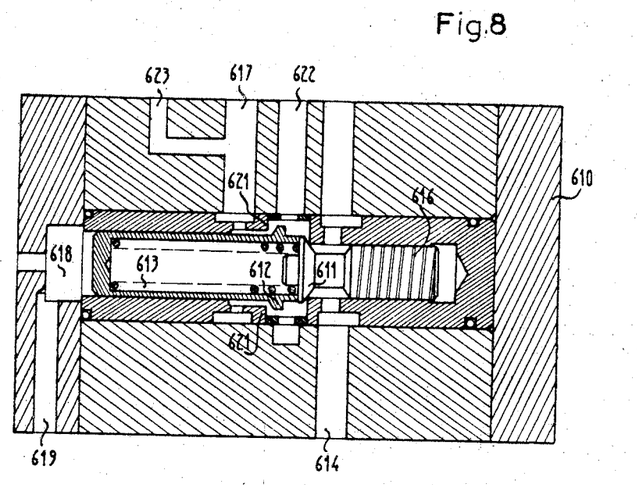

FIG. 8 represents on an enlarged scale the servobloc 610 when the motor runs at a fast speed. Inside block 610 are two valves 611 and 612 normally separated from each other by a spring 613 inside vlave 612. By examining FIGS. 7 and 8 together, it can be seen that valve 611 is in parallel on conduit 614 which feeds motor 1 from the hydraulic station, the flow of the liquid being regulated by a flow regulator or governor 615. Part 616 of the valve constitutes a bumper for this valve.

Valve 612 is in series on conduit 617 which is that of the conduit of the motor. In the position represented on FIG. 8, valve 604 is assumed to be closed; back of valve 612 is a cavity 618, fed by a conduit 619 connected to the hydraulic station through a choke 620; when valve 604 is closed, cavity 618 is under pressure, and valve 612 is thrust to the right, pressing spring 613. Therefore, it is lifted from its seat 621 and the fluid, returning from the motor by conduit 617, passes freely into conduit 622 which sends it back to the tank.

If now valve 604, which is normally closed, is opened, cavity 618 is no longer under pressure, and valve 612 is moved to the left under the action of spring 613. It falls back on its seat 621. This is the position represented in FIG. 9. Not being able to go into conduit 622, the fluid returning from motor 1 passes into conduit 623 which also goes to the tank, but by passing into a flow regulator 624; this regulator fixes the slow speed of motor 1.

Figure 9:
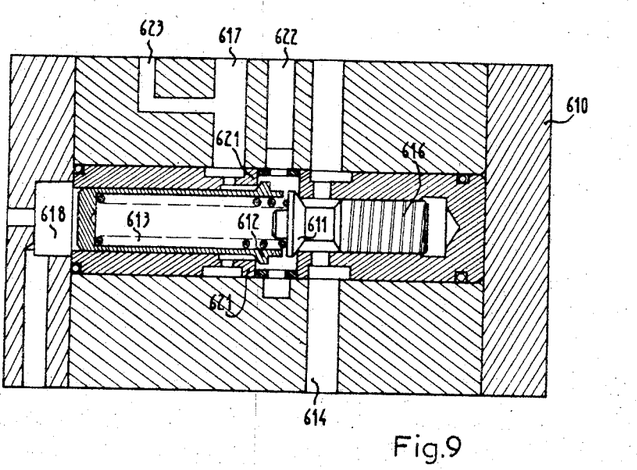

At the moment of passage from fast speed to slow speed, there is a high pressure in conduit 614. Since valve 611 is no longer applied on its seat by valve 612, it rises by compressing spring 613 which momentarily opens conduit 614 to conduit 622, i.e., to the tank; to prevent it from hunting, at the moment of passage from fast speed to slow speed, a bumper 616 is provided.

FIG. 7 in addition shows that between servobloc 610 and motor 1 is inserted a reverse 625 with a neutral point operated manually by a lever 626; in FIG. 7 the reverse is at the neutral point.

Figure 3:
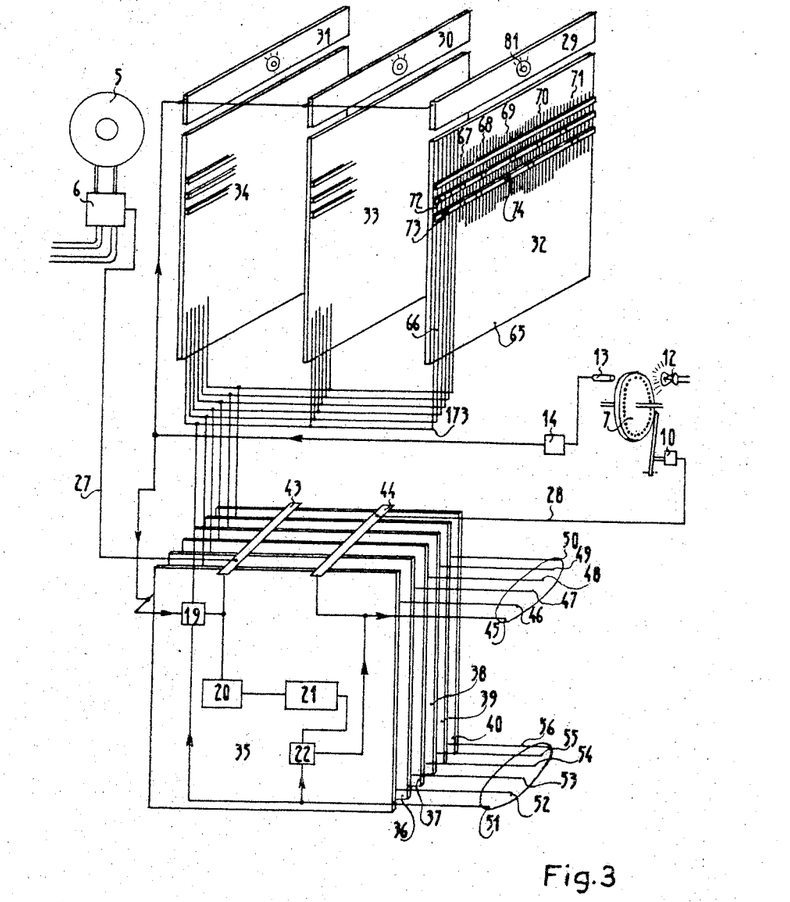
FIG. 3 is a wiring diagram for the system in FIG. 1.

Now that a description has been given of how the carriage is stopped and a machine, such as a punch, is caused to operate in the hypothetical mode of just one such machine, a description will now be given of how the complete system shown in FIG. 1 is linked together, reference now being made to FIG. 3.

In this figure there can be seen the gear 7, the light source 12, the photodiode 13 and the pulse-coding device 14. The counting pulses pass not just to a single counter 15 (FIG. 2 or 7) but to three counters 29–31, similar to counter 15 and driven in parallel by said counting pulses; and not just to a single controller 35 but to six controllers 35–40. The number of counters is equal to the number of working planes, and the number of controllers is equal to the number of machines, devices or attachments. Associated with the respective counters are display panels 32–34 each of which performs the same function as the display panel 115 in FIG. 2 or 7 but is of a different construction. Each panel is formed by an insulating rectangular sheet or like base, as 65, with conductive strips 80 (FIG. 4) embedded in it, parallel with one of its sides, say the vertical side. The strips form two series. The first six strips form a first series 66 and are each allotted to one controller 35–40—i.e., to one machine. Each strip of this series is connected by a lead such as 173 to the input bistable circuit 19 of the corresponding controller 35; in other words, each lead 173 is the equivalent of lead 120 of FIG. 2 or 7; the corresponding strips of the series 66 of each display panel 32–34 are connected in parallel. The second series is formed by as many strips as the associated counter 29–31 has outputs. In the particular case concerned here, there are two strips for the fourth-order decade (group 67) and ten strips each for the third-order decade (group 68), second-order decade (group 69), first-order decade (group 70) and zero-order decade (group 71).

These strips are connected to the output terminals of the corresponding counter, the two strips of group 67 being connected to leads such as 156 and 157 (FIG. 2 or 7), the ten strips of group 68 being connected respectively to the ten outputs of a binary-decimal decoder such as 354 of FIG. 7, and so on.

Crossing but not electrically contacting these strips are bars, as 72, and disposed on each bar 72 are markers such as 73, 74 in the form of sliders of which there are one more than the number of decades on the panel. The slider 73 is shown allotted to the first series to strips 66 and the slider 74 is shown allotted to the second-order decade 69. Each slider has a window 75 (see FIGS. 4 and 5) displaying a digit engraved on the bar 72; this digit corresponds to the order number of one of the machine or to a digit from the decade indicating quantity to be displayed.

Each bar 72 is devoted to one operation to be performed by the machine the number of which is visible in the window of its marker 73; the operation is to be performed on the workpiece by that machine at the position predetermined by the five markers 74 of that bar; supposing that machine No. 2, a punching machine for example, has to punch the workpiece when said workpiece has advanced 247 millimeters from zero reference, marker 73 should indicate 2, and the five markers 74 should indicate 0, 0, 2, 4, 7 respectively.

A bar, as 72, corresponds in function to the bus-bar 117 of FIG. 2 or 7. It is negatively biased through a resistor 76 (see FIG. 4), which is the equivalent of resistor 220 of FIG. 2 or 7. Each slider comprises a diode, as 77, which is disposed between a resilient strip 78 contacting the bar 72 and a strip 79 contacting one of the strips 80 embedded in the sheet 65. Any one bar corresponds therefore to an operation to be performed by a machine, and so as many bars per panel must be provided as there are operations to be performed in the corresponding working plane.

On each bar, the left marker 73 is used to indicate which machine has to operate, and further markers are used to indicate the location of the operation to be effected by that machine.

Of course, a machine is disposed in one particular working plane and it may seem unnecessary to provide all the panels with strips for all the machines. However, this leads to greater flexibility of operation, as will become apparent hereinafter.

Returning now to FIG. 3, the counters 29–31 receive the counting pulses in parallel and count together. However, each counter counts from a different starting point in order to allow for the differences between the working planes associated with each counter. The counters have a button, as 81, having, for instance, three positions if three working planes are provided; these positions determine the starting point of counter resetting whenever a workpiece starts to pass through. By this means the counting difference between two counters is made equal to the reference difference between their respective working planes.

All the controllers 35–40 ar similar to the controller 35 shown in FIG. 2. The outputs of their output triggers 19 are connected to an or-gate 43 supplying conductor 27 to the motor control system 6. The outputs of their output triggers 22 are connected to an or-gate 44 supplying conductor 28 extending to the armature 10. The output triggers 22 also have independent outputs 45–50 to the actuating device of each of the corresponding machines. The input and output triggers of any one controller are restored simultaneously—but independently as between different controllers—via conductors 51–56 which correspond to the conductor 24 of FIG. 2, or lead 340 of FIG. 6.

Assuming that the motor 5 is running, then, when—and only when—one of the counters corresponds to a reference displayed on a bar 72 of the panel corresponding to such counter, the bar 72 which is at zero potential as long as any one of the five output terminals of the counter indicated by the five markers such as 74 is at zero potential, become sufficiently negative for its negative potential to be applied through the slider 73 and a conductor 173 to the input trigger 19, for instance, of the controller 35 if the machine designated by slider 73 is the machine corresponding to controller 35. Events proceed therein as in the case shown in FIG. 2. First, the motor runs slowly (conductor 27), second, the carriage is locked (conductor 28) and the operation of the machine associated with the controller 35 is initiated (conductor 51). Other operations can be arranged to occur simultaneously in the same working plane or in other working planes.

When one of these simultaneous operations is completed, the input and output triggers of the controllers of the machine which has performed the operation are restored (conductors 45–50). When—and only when—all the simultaneous operations have been completed in all the working planes, the or-gate 44 ceases to receive a signal, the armature 10 returns to the normal state and the carriage 1 releases. The carriage 1 starts moving again in one of two possible manners.

If no coincidence has been detected since the last changeover from fast-running to slow-running, all the input triggers of all the controllers which have not been restored or reset by an end-of-work signal are already in the normal state. The or-gate 43 receives no signal and the motor resumes fast running.

If one or more coincidences has or have already been detected while the motor was already running slowly in preparation for the operation or operations now completed, the input triggers of the controllers of the particular machines concerned in the succeeding operations have changed over and not been reset. The or each trigger concerned keeps the conductor 27 negative and so the motor restarts at its slow speed.

Clearly, restarting of the carriage is controlled by completion of the operation of that machine whose operation has lasted longest at the particular predetermined position concerned. Consequently, machines having very different operating times, such as punches and drills, can be made to operate in the same position.

As already stated, the resetting of the counters 29–31 can be adjusted by a button as 81. If there were only one working plane, the resetting of all the counters would be adjusted to the reference corresponding to this plane and all the bars of all the display panels would be available for the plane. If there are two working planes and three counters, two panels can, if required, be allotted to one of the planes. If, as is the case shown in FIG. 1, there are three working planes and three counters and if the bars associated with the working plane of the ram 139, for example, are present in excess but there is a shortage of bars in the other planes for the required programme, operations in excess can be transferred from one plane to another provided that the references written in for the operations to be performed in a working plane not corresponding to the panel allow for the reference differences between the two planes concerned. This is why each display panel has bars associated with all the machines. This feature, as already stated, can increase flexibility of operation.

What is claimed is:

1. A digitally controlled positioning device for transferring an elongated workpiece (100) at a succession of predetermined positions at which machining operations are to be performed according to a programme, comprising a driving mechanism (103, 1, 5) for supporting and displacing said workpiece at a normal or low speed, a quantized readout device (7, 12, 13, 14) generating counting pulses during displacement of said workpiece, a machine tool unit (110) including a plurality of machines (135–139) in a limited number of work planes, a plurality of counters (29–31) driven by said counting pulses and computing totals corresponding to each of said work planes, a plurality of display boards (32–34) adapted to display said predetermined positions in the form of digital values, each display board corresponding to one counter, on each display board a plurality of comparators (215) adapted to detect any coincidence between each digital value and the total in the counter corresponding to that display board, a plurality of control blocks (35–40), each control block being associated with a machine and comprising an input bistable circuit (19) connected to said comparators, an and-gate (20) operated by said input bistable circuit, a cyclic counter (21) driven by said counting pulses through said and-gate, and an output bistable circuit (22) operated by said cyclic counter, means (6) adapted to change said driving mechanism from normal to low speed when one of said input bistable circuit (19) is in operating condition, means (9, 10) adapted to lock said driving mechanism when one of said output bistable circuit (22) is in operating condition and to actuate the operation of the corresponding machine (135), and means (24) to reset the input and output bistable circuits (19, 22) of a control block when the operation of the machine associated therewith is performed.

2. A digitally controlled positioning device for transferring an elongated workpiece (100) at a succession of predetermined positions at which machining operations are to be performed according to a programme, comprising a driving mechanism (103, 1, 5) for supporting and displacing said workpiece at a normal or a low speed, a quantized readout device (7, 12, 13, 14) generating counting pulses during the displacement of said workpiece, a machine tool unit (110) including a plurality of machines (135–139) in a limited number of work planes, a plurality of counters (29–31) driven by said counting pulses and computing totals corresponding to each of said work planes, a plurality of display boards (32–34) consisting in an insulating sheet (65) carrying a first group of parallel conductive strips (66), a second group (67–71) of parallel conductive strips, a plurality of conductive bars (72) carrying one marker (73) cooperating with said first group to denote a machine and further markers (74) cooperating with said second group to denote a predetermined position in the form of a digital value, each display board (32–34) being associated with a work plane and each bar (72) being associated to an operation to be performed, means (173) adapted to detect a coincidence between each digital value and the total in the counter corresponding to that display board, a plurality of control blocks (35–40), each control block being associated with a machine and comprising an input bistable circuit (19) connected to said comparators, an and-gate (20) operated by said input bistable circuit, a cyclic counter (21) driven by said counting pulses through said and-gate, and an output bistable circuit (22) operated by said cyclic counter, means (6) adapted to change said driving mechanism from normal to low speed when one of said input bistable circuit (19) is in operating condition, means (9, 10) adapted to lock said driving mechanism when one of said output bistable circuit (22) is in operating condition and to actuate the operation of the corresponding machine (135), and means (24) to reset the input and output bistable circuits (19, 22) of a control block when the operation of the machine associated therewith is performed.

References Cited

UNITED STATES PATENTS

| 2,969,490 | 1/1961 | Anderson et al. | 318—162 |
| 3,069,608 | 12/1962 | Forrester et al. | 318—162 |
| 3,098,187 | 7/1963 | Sciaky | 318—162 |
| 3,218,532 | 11/1965 | Toscano | 318—28 |

BENJAMIN DOBECK, *Primary Examiner.*

U.S. Cl. X.R.

318—28; 235—151.11